United States Patent Office 3,244,586
Patented Apr. 5, 1966

3,244,586
O-PYRIDYL PHOSPHATES AND PHOSPHORO-THIOATES
Raymond H. Rigterink, Midland, Mich., assignor to The Dow Chemical Company, Midland, Mich., a corporation of Delaware
No Drawing. Filed Apr. 30, 1962, Ser. No. 191,350
18 Claims. (Cl. 167—33)

The present invention is directed to halopyridyl phosphates having the formula

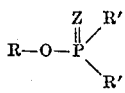

In this and succeeding formulae, R represents halopyridyl, Z represents oxygen or sulfur, and each R' represents loweralkoxy, amino, or loweralkylamino. In the present specification and claims, the terms loweralkoxy and loweralkyl refer to radicals being of from 1 to 8, inclusive, carbon atoms.

These compounds are solid or viscous liquid materials which are somewhat soluble in many common organic solvents and of very low solubility in water. The compounds are useful as pesticides and are especially adapted to be employed as active toxicants in compositions for the control of a number of mite, insect and bacterial and fungal organisms, such as beetles, ticks, worms, aphids, flies, roaches, cattle grubs, screw worms, trash fish, snails, ascarids, nematodes, roundworms, and *Rizoctonia solani*.

The novel compounds of the present invention are prepared by several methods. In a preferred method, the compounds are prepared by reacting a phosphorochloridate or phosphorochloridothioate having the formula

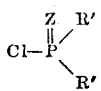

with an alkali metal or tertiaryamine salt of a halopyridinol having the formulae

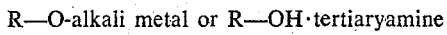

R—O-alkali metal or R—OH·tertiaryamine

The reaction conveniently is carried out in an inert organic liquid such as acetone, dimethylformamide, carbon tetrachloride, chloroform, benzene, toluene, isobutyl methyl ketone, or methylene dichloride. The amounts of the reagents to be employed are not critical, some of the desired product being obtained when employing any proportion of the reactants. In the preferred method of operation, good results are obtained when employing substantially equimolecular proportions of the pyridinol salt and phosphorochloridate or phosphorochloridothioate. The reaction takes place smoothly at the temperature range of from 0° to 100° C. with the production of the desired product and chloride byproduct. In carrying out the reaction, the reactants are mixed and contacted together in any convenient fashion, and the resulting mixture maintained for a period of time in the reaction temperature range to complete the reaction. Following the completion of the reaction, the reaction mixture is washed with water and any organic reaction medium removed by fractional distillation under reduced pressure to obtain the desired product as a residue. This product can be further purified by conventional procedures such as washing with water and dilute aqueous alkali metal hydroxide, solvent extraction and recrystallization.

In an alternative procedure, the phosphoramidates or phosphoroamidothioates can be prepared by reacting a phosphorodichloridate or phosphorodichloridothioate having the formula

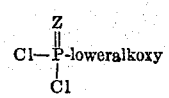

with an alkali metal salt or tertiaryamine salt of a halopyridinol, as previously defined, to form an intermediate halopyridyl phosphorochloridate or phosphorochloridothioate having the structure

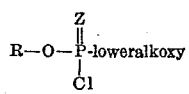

This intermediate is thereafter reacted with an amino compound such as ammonia or a loweralkylamine to produce the desired phosphoramidate or phosphoramidothioate. The reaction conveniently is carried out in a reaction medium such as benzene, acetone, dimethylformamide, chloroform, carbon tetrachloride, or methylene chloride. Good results are obtained when employing substantially equimolecular proportions of the loweralkoxy phosphorodichloridate or phosphorodichloridothioate and halopyridinol salt and at least 2-molecular proportions of amino compound. The reaction with the halopyridinol salt is somewhat exothermic and is carried out at temperature of from —50° to 25° C. The reaction between the intermediate halopyridyl phosphorochloridate or phosphorochloridothioate and the amino compound is also exothermic and takes place at the temperature range of from —10° to 60° C. The temperature can be controlled by regulating the rate of mixing and contacting the reactants together and by external cooling. The byproduct in both steps of the reaction is chloride. In the first step, the chloride appears as alkali metal or tertiaryamine chloride. In the second step, the chloride is removed as the hydrochloride salt of the amine or ammonia reactant. Following the reaction, the desired product can be separated in accordance with the conventional procedures as previously described.

In an alternative procedure, the compounds of the present invention can be prepared by reacting phosphorus oxychloride or phosphorus thiochloride with a halopyridinol salt as previously defined to form an intermediate halopyridyl phosphorodichloridate or phosphorodichloridothioate. Good results are obtained when employing substantially equimolecular proportions of the reagents. The reaction takes place readily at temperatures of from —50° to 80° C. with the production of the desired product and halide of reaction. The intermediate is thereafter reacted with an alkali metal alcoholate or an amino compound such as ammonia or a lower alkylamine, or successively with two of three reagents to produce the desired compound either as a monoester, diester or triester product. The reaction takes place at temperatures at which chloride of reaction is formed. This chloride appears in the reaction mixture as alkali metal chloride or amine chloride depending upon whether an alcoholate or amine product is employed as a reactant. Good results are obtained when operating at temperatures of from —10° to 60° C. and employing substantially stoichiometric amounts of the reactants. Upon completion of the reaction, the desired product is separated by the conventional procedures as previously described.

The following examples merely illustrate the invention and are not to be construed as limiting:

EXAMPLE 1

*O-methyl O-3,5,6-trichloro-2-pyridyl isopropyl phosphoramidothioate*

3,5,6-trichloro-2-pyridinol (9.5 grams; 0.05 mole), anhydrous sodium carbonate (5.3 grams; 0.05 mole), and 100 milliliters of dimethylformamide are stirred together at room temperature to produce the sodium salt of the 3,5,6-trichloro-2-pyridinol. O-methyl isopropylphosphoramidochloridothioate (9.4 grams; 0.05 mole) is added rapidly thereto with stirring. During the addition, the temperature of the reaction mixture rises to about 27° C. Stirring is thereafter continued and the temperature raised to 60° and retained at from 60° to 65° C. for 2 hours to complete the reaction. The reaction mixture is then filtered, the reaction medium removed from the filtrate by distillation under reduced pressure, and the residue dispersed in benzene. The benzene mixture is thereafter washed with water and the benzene removed from the washed product by evaporation to obtain the O-methyl O-3,5,6-trichloro-2-pyridyl isopropylphosphoramidothioate product as a white solid melting at 79–81° C. and having a nitrogen content of 7.72 percent as compared to a theoretical content of 8.00 percent.

EXAMPLE 2

*Methyl 3,5-dichloro-2-pyridyl isopropylphosphoramidate*

3,5-dichloro-2-pyridinol (8.2 grams; 0.05 mole), aqueous 50 percent sodium hydroxide (equivalent to 0.05 mole) and 200 milliliters of isobutyl methyl ketone, are mixed together and heated at the boiling temperature to distill a mixture of about 100 milliliters of reaction medium together with water of reaction as formed. The remaining solution is cooled to about −40° C. and methyl phosphorodichloridate (7.5 grams; 0.05 mole) added all at once with stirring. Stirring is continued for one hour allowing the temperature to rise to 25° C. Isopropylamine (5.9 grams; 0.1 mole) is then added portionwise with stirring and cooling to the above described mixture containing the intermediate methyl 3,5-dichloro-2-pyridyl phosphorochloridate. The addition is carried out in ten minutes and at a temperature of from 0 to 10° C. Stirring is then continued for one hour allowing the temperature to rise to 25° C. to complete the reaction. The reaction mixture is thereafter washed with water and the reaction medium removed by fractional distillation under reduced pressure to obtain the methyl 3,5-dichloro-2-pyridyl isopropylphosphoramidate product as a tan oil having a refractive index $n/D$ of 1.5316 at 25° C.

EXAMPLE 3

*O-methyl O-3,4,5,6-tetrachloro-2-pyridyl isopropylphosphoramidothioate*

3,4,5,6-tetrachloro-2-pyridinol (9.3 grams; 0.04 mole), sodium carbonate (4.2 grams; 0.04 mole), and dimethylformamide, are stirred together at room temperature to produce the sodium salt of 3,4,5,6-tetrachloro-2-pyridinol. O-methyl isopropylphosphoramidochloridothioate (7.6 grams; 0.04 mole) is added rapidly to the salt mixture with stirring. During the addition, the temperature of the reaction mixture rises to about 26° C. The temperature of the reaction mixture is raised to 60° C. and retained at from 60° to 65° C. for one hour to complete the reaction. The reaction mixture is then filtered, the reaction medium removed from the filtrate by distillation under reduced pressure, and the residue dispersed in benzene. The benzene mixture is thereafter washed with water and the benzene removed from the washed product by distillation under reduced pressure to obtain the O-methyl O-3,4,5,6-tetrachloro-2-pyridyl isopropylphosphoramidothioate product as a residue. This residue is recrystallized from a petroleum ether boiling at a range of from 60 to 70° C. and is found to be a white crystalline solid melting at 77 to 81° C.

EXAMPLE 4

*O,O-diethyl O-2,4,6-tribromo-3-pyridyl phosphorothioate*

2,4,6-tribromo-3-pyridinol (9.9 grams; 0.03 mole) sodium carbonate (3.2 grams; 0.03 mole), and dimethylformamide (100 milliliters), are mixed together with stirring at room temperature to produce the sodium salt of the 2,4,6-tribromo-3-pyridinol. O,O-diethyl phosphorochloridothioate (5.6 grams; 0.03 mole) is added rapidly to this salt mixture with stirring. Within a few minutes, the temperature of the reaction mixture rises to about 26° C. The resulting mixture is then heated at 60–65° C. with stirring for two hours to complete the reaction. The reaction mixture is thereafter filtered and the reaction medium removed from the filtrate by distillation under reduced pressure to obtain the O,O-diethyl O-2,4,6-tribromo-3-pyridyl phosphorothioate product as a residue. This residue is dispersed in benzene, the resulting mixture washed with water, and the benzene thereafter removed by distillation under vacuum to obtain the O,O-diethyl O-2,4,6-tribromo-3-pyridyl phosphorothioate as an amber viscous liquid having a refractive index $n/D$ of 1.5836 at 25° C.

EXAMPLE 5

*O-methyl O-2-chloro-3-pyridylisopropylphosphoramidothioate*

2-chloro-3-pyridinol (13.0 grams; 0.1 mole), anhydrous sodium carbonate (10.6 grams; 0.1 mole), and dimethylformamide (150 milliliters), are stirred together at room temperature for 0.5 hour to produce the sodium salt of the 2-chloro-3-pyridinol. O-methyl isopropylphosphoramidochloridothioate (18.8 grams; 0.1 mole) is added rapidly to the salt mixture with stirring. The temperature of the reaction mixture rises to about 27° C. during the addition of the O-methyl isoproplyphosphoramidochloridothioate. The resulting mixture is then heated at from 60 to 65° C., with stirring for two hours to complete the reaction. The reaction mixture is thereafter filtered, the reaction medium removed from the filtrate by distillation under reduced pressure, and the residue dispersed in benzene. The benzene mixture is then washed with water, and the benzene removed from the washed product by distillation under reduced pressure to obtain the O-methyl O-2-chloro-3-pyridyl isopropylphosphoramidothioate product as a dark amber liquid having a refraction index $n/D$ of 1.5374 at 25° C.

EXAMPLE 6

*Diethyl 3,5,6-trichloro-2-pyridyl phosphate*

3,5,6-trichloro-2-pyridinol (9.9 grams; 0.05 mole), triethylamine (5.1 grams; 0.05 mole), and chloroform (150 milliliters) are mixed and stirred together to produce the triethylamine salt of 3,5,6-trichloro-2-pyridinol. Diethyl phosphorochloridate (8.6 grams; 0.05 mole) is added to the salt mixture rapidly and with stirring. During the addition of the diethyl phosphorochloridate the temperature of the reaction mixture rises to about 32° C. Stirring is thereafter continued and the temperature maintained at from 60 to 65° C. for two hours to complete the reaction. The reaction mixture is thereafter permitted to cool, the cooled mixture washed with water, and the reaction medium removed from the washed mixture by evaporation under reduced pressure. As a result of these operations there is obtained the diethyl 3,5,6-trichloro-2-pyridyl phosphate as an amber liquid having a refractive index $n/D$ of 1.5146 at 25° C., and a nitrogen content of of 4.01 per cent as compared to a theoretical content of 4.18 percent.

EXAMPLE 7

*O-3,5,6-trichloro-2-pyridyl N,N'-dimethylphosphorodiamidothioate*

3,5,6-trichloro-2-pyridinol (9.9 grams; 0.05 mole), aqueous 50 percent sodium hydroxide (equivalent to 0.05 mole), and 200 milliliters of isobutyl methyl ketone, are mixed together and heated at the boiling temperature to distill a mixture of about 100 milliliters of reaction medium together with water of reaction as formed. The remaining mixture is cooled to about 3° C., and phosphorus thiochloride (8.5 grams; 0.05 mole) is added rapidly thereto with stirring. Stirring is continued for 1.5 hours, the temperature being permitted to rise to about 8° C., to obtain the intermediate O-3,5,6-trichloro-2-pyridyl phosphorodichloridothioate. Methylamine is then added to the mixture containing the intermediate. The addition of the methylamine takes place in about 0.33 hour, the temperature of the reaction mixture being maintained at about 20° C. Stirring is continued for one hour, the temperature of the reaction mixture being permitted to rise to 25° C. The reaction mixture is thereafter washed with water and the reaction medium removed by fractional distillation under reduced pressure to obtain the O-3,5,6-trichloro-2-pyridyl N,N'-dimethylphosphorodiamidothioate product as a residue. This product is recrystallized from a petroleum ether boiling at a range of from 86 to 100° C. and found to be a white crystalline solid melting at 86 to 89° C.

In a similar manner, the following products of the present invention are prepared.

| Compound | Property |
|---|---|
| O - methyl O - 3,5,6 - trichloro - 2-pyridyl sec - butylphosphoramidothioate | $n/D$ of 1.5500. |
| O - ethyl O - 3,5,6 - trichloro - 2-pyridyl ethylphosphoramidothioate | $n/D$ of 1.5437. |
| Hexyl 5,6 - dichloro - 2 - pyridyl dimethylphosphoramidate | M.W. of 355.2. |
| O - isopropyl O - 3,5,6 - trichloro - 2 - pyridyl phosphoramidothioate | $n/D$ of 1.5594. |
| O - methyl O - 3,5 - dibromo - 2-pyridyl n - hexylphosphoramidothioate | M.W. of 648.2. |
| O - butyl O - 3,5 - dichloro-2 - pyridyl methylphosphoramidothioate | M.P. of 62–64° C. |
| O - isopropyl O - 3,5 - dichloro-2 - pyridyl methylphosphoramidothioate | M.P. of 86–89° C. |
| O - n - octyl O - 3,5 -dichloro - 2-pyridyl N - n - hexyl - N-methylphosphoramidothioate | M.W. of 469.5. |
| O - sec - butyl O - 3,5 - dichloro-2 - pyridyl methylphosphoramidothioate | M.P. of 82–86° C. |
| O - methyl O - 2,3,5 - trichloro-4 - pyridyl - isopropylphosphoramidothioate | $n/D$ of 1.5351. |
| Methyl 3,5,6 - triiodo - 2 - pyridyl dibutylphosphoramidate | M.W. of 635.9. |
| Dibutyl 3,5 - dibromo - 2 - pyridyl phosphate | M.W. of 365.1. |
| Diethyl 3,5 - dichloro - 2 - pyridyl phosphate | $n/D$ of 1.4977. |
| O,O - dipentyl O - 2 - bromo - 3-pyridyl phosphorothioate | M.W. of 370.3. |
| O,O - diethyl O - 3,5 - dibromo - 6-chloro - 2 - pyridyl phosphorothioate | M.P. of 59–61° C. |
| Dimethyl 3,5 - diiodo - 2 - pyridyl phosphate | M.W. 454.9. |
| O - ethyl O - methyl O - 3,5-dichloro - 2 - pyridyl phosphorothioate | M.W. of 302.1. |
| O - isobutyl O - 3,5 - dichloro - 2-pyridyl methylphosphoramidothioate | M.P. of 76–78° C. |
| O - propyl O - 3,5 - dichloro - 2-pyridyl methylphosphoramidothioate | M.W. of 315.2. |
| O,O - diethyl O - 3,5,6 - trichloro-2 - pyridyl phosphorothioate | M.P. of 41–42° C. |
| O - isopropyl O - 3,5 - dichloro-2 - pyridyl isopropylphosphoramidothioate | $n/D$ of 1.5322. |
| O - methyl O - 3,5,6 - trichloro-2 - pyridyl isopropylphosphoramidothioate | M.P. of 79–81° C. |
| O - methyl O - 5 - chloro - 2 - pyridyl isopropylphosphoramidothioate | $n/D$ of 1.5258. |
| O - methyl O - 3,5 - dibromo-2 - pyridyl isopropylphosphoramidothioate | M.P. of 63–68° C. |
| n - Hexyl methyl 3,5,6 - trichloro-2 - pyridyl phosphate | M.W. of 376.6. |
| O - methyl O - 2 - chloro - 3 - pyridyl isopropylphosphoramidothioate | $n/D$ of 1.5374. |
| O,O - diethyl O - 2,3,5 - trichloro-4 - pyridyl phosphorothioate | $n/D$ of 1.5269. |
| O,O - diethyl O - 3,5 - dibromo-2 - pyridyl phosphorothioate | $n/D$ of 1.5650. |
| O,O - diethyl O - 2 - chloro - 3-pyridyl phosphorothioate | $n/D$ of 1.5145. |
| O,O - diethyl O - 3,5 - dichloro-2 - pyridyl phosphorothioate | $n/D$ of 1.5336. |
| O - methyl O - 3,5 - dichloro - 2-pyridyl isopropylphosphoramidothioate | M.P. of 52–56° C. |
| O - methyl O - 3,5,6 - trichloro-2 - pyridyl methylphosphoramidothioate | $n/D$ of 1.5672. |
| O - methyl O - 3,5,6 - trichloro-2 - pyridyl ethylphosphoramidothioate | $n/D$ of 1.5584. |
| O - ethyl O - 3,5,6 - trichloro-2 - pyridyl methylphosphoramidothioate | $n/D$ of 1.5507. |
| O - 3,5 - dichloro - 2 - pyridyl N-butyl - N' - methylphosphorodiamidothioate | M.W. of 328.2. |
| O - isopropyl O - 3,5,6-trichloro-2 - pyridyl methylphosphoramidothioate | $n/D$ of 1.5401. |
| O - methyl O - 3,5,6 - trichloro-2 - pyridyl propylphosphoramidothioate | $n/D$ of 1.5519. |
| Methyl 3,5,6 - trichloro - 2 - pyridyl isopropylphosphoramidate | M.P. of 117–119° C. |
| O - methyl O - 2 - bromo - 3 - pyridyl isopropylphosphoramidothioate | $n/D$ of 1.5618. |
| O - isobutyl O - 3,5,6 - trichloro-2 - pyridyl methylphosphoramidothioate | $n/D$ of 1.5310. |
| O,O - diethyl O - 3,4,5,6 - tetrachloro - 2 - pyridyl phosphorothioate | M.P. of 47–49° C. |
| O - methyl O - 3,5,6 - trichloro-2 - pyridyl dimethylphosphoramidothioate | $n/D$ of 1.5740. |
| O,O - diethyl O - 3,5 - dichloro-4 - pyridyl phosphorothioate | $n/D$ of 1.5210. |
| O,O - diethyl O - 2 - bromo - 3-pyridyl phosphorothioate | $n/D$ of 1.5433. |

| Compound | Value |
|---|---|
| O,O - dimethyl O - 3,5,6 - trichloro - 2 - pyridyl phosphorothioate | n/D of 1.5745. |
| O,O - diethyl O - 6 - chloro - 2-pyridyl phosphorothioate | n/D of 1.5277. |
| Methyl 3,5 - dichloro - 2 - pyridyl isopropylphosphoramidate | n/D of 1.5316. |
| O -) methyl O - 3,5 - dibromo-2 - pyridyl methylphosphoramidothioate | M.P. of 93–95° C. |
| O - ethyl O - 3,5 - dibromo - 2 - pyridyl methylphosphoramidothioate | M.P. of 88–90° C. |
| O - methyl O - 2 - bromo - 3 - pyridyl n - octylphosphoramidothioate | M.W. of 261.2. |
| O - ethyl O - 3,5 - dichloro - 2 - pyridyl methylphosphoramidothioate | M.P. of 71–73° C. |
| O - methyl O - 3,5 - dichloro-2 - pyridyl methylphosphoramidothioate | M.P. of 84–86° C. |
| O - methyl O - 3,5 - dichloro-2 - pyridyl ethylphosphoramidothioate | M.P. of 89–91° C. |
| O - ethyl O - 3,5 - dichloro - 2-pyridyl ethylphosphoramidothioate | M.P. of 68–70° C. |
| O,O - diethyl O - 3,5 - diiodo - 4-pyridyl phosphorothioate | n/D of 1.5689. |
| O - isopropyl O - 3,5 - dibromo-2 - pyridyl methylphosphoramidothioate | M.P. of 85–87° C. |
| Diethyl 2,3,5 - trichloro - 4 - pyridyl phosphate | n/D of 1.5167. |
| O,O - diethyl O - 2,6 - dibromo-3 - pyridyl phosphorothioate | n/D of 1.5599. |
| O,O - diethyl O - 3,5 - dibromo-4 - pyridyl phosphorothioate | n/D of 1.5745. |
| O - propyl O - 3,5 - dichloro-2 - pyridyl methylphosphoramidothioate | M.P. of 52–55° C. |
| 3,5,6 - trichloro - 2 - pyridyl N,N'-dimethylphosphorodiamidate | M.P. of 146–148° C. |
| O - propyl O - 3,5 - dichloro-2 - pyridyl propylphosphoramidothioate | M.P. of 60–62° C. |
| O - methyl O - 6 - chloro - 2 - pyridyl isopropylphosphoramidothioate | n/D of 1.5337. |
| O,O - diethyl O - 2,3,6 - trichloro-4 - pyridyl phosphorothioate | n/D of 1.5398. |
| O,O - diethyl O - 3,4,6 - trichloro 2 - pyridyl phosphorothioate | M.P. of 53–55° C. |
| O - methyl O - 2,3,6 - trichloro-4 - pyridyl isopropylphosphoramidothioate | n/D of 1.5528. |
| O - methyl O - 3,4,6 - trichloro-2 - pyridyl isopropylphosphoramidothioate | M.P. of 80–82° C. |
| O,O - diethyl O - 4,6 - dichloro-2 - pyridyl phosphorothioate | n/D of 1.5285. |
| O - methyl O - 4,6 - dichloro - 2-pyridyl isopropylphosphoramidothioate | M.P. of 51–54° C. |
| O,O - diethyl O - 5,6 - dichloro-2 - pyridyl phosphorothioate | n/D of 1.5276. |
| O - propyl O - 5,6 - dichloro - 2-pyridyl methylphosphoramidothioate | n/D of 1.5440. |
| Propyl 3,5,6 - trichloro - 2 - pyridyl methylphosphoramidate | M.P. of 68–71° C. |
| O - propyl O -3,6 - dichloro - 2-pyridyl methylphosphoramidothioate | n/D of 1.5402. |
| O - propyl O - 5 - chloro - 3 - pyridyl methylphosphoramidothioate | n/D of 1.5400. |
| O - 3,5 - dibromo - 6 - chloro - 2-pyridyl N - isoproyl - N - methylphosphorodiamidothioate | M.W. of 437.6. |
| O - methyl O - 5 - chloro - 3 - pyridyl isopropylphosphoramidothioate | n/D of 1.5414. |
| O,O - diethyl O - 5 - chloro - 3-pyridyl phosphorothioate | n/D of 1.5165. |

For those compounds of the preceding table identified by a refractive index, the index is measured at 25° C. The letters M.P. and M.W. are abbreviations, respectively, for the terms melting point and molecular weight.

The compounds of the present invention are useful as pest repellents and pesticides in a variety of household, industrial, and agricultural operations. Thus they are useful for the control of various water pests such as trash fish and entomostracans. They are also useful in animal husbandry against pests attacking warm-blooded animals, including helminths, round worms, and other parasitic organisms. They can also be employed for the control of household and industrial pests including house flies, cockroaches, and confused flour beetles.

It has further been discovered that the new halopyridyl compounds are extremely effective for the control of many parasitic organisms, particularly those found on the roots or aerial portions of growing plants inclusive of aphids, mites, plant pathogens, and insects. These compounds have outstanding activity, at low concentrations, against chewing and sucking types of insects, such as southern armyworm (*Prodenia eridania*), California red scale (*Aonidiella aurantii*), and Mexican bean beetle (*Epilachna varivestis*). They are also extremely useful for the impregnation of soil in nematocidal concentrations for the control of nematodes such as root-knot nematode.

The new compounds can also be included in inks, adhesives, soaps, high energy fuels, polymeric materials, cutting oils or in oil or latex paints to prevent the attack by various pests and the degradation of such products resulting from attack of bacterial and fungal organisms. Also, the present compounds can be distributed in textiles, cellulosic materials, or in grain, or can be employed in the impregnation of wood and lumber to preserve and protect such products from the attack of the organisms of rot, mold and decay. Additionally, they can be applied to seeds to protect the seeds from the attack of pests.

Compositions comprising one of the halopyridyl phosphates as an active ingredient in association with various carriers, surface active agents and other additaments are very useful for the control of those undersirable pests. It is an advantage of the present invention that compositions containing the compounds can be applied to soil or growing vegetation in amounts required for pest control without significant injury to plant foliage.

In carrying out the method of the present invention, the undesirable pests can be controlled by contacting the organism, its habitat, and/or its food prior to ingestion with a parasiticidal amount of the unmodified halopyridyl phosphate. However the present method also embraces the employment of a liquid or dust composition containing the toxicant. Such compositions are adapted to be applied to living plants without substantial injury to the foliage thereof. In preparing toxicant compositions, the halopyridyl phosphate product can be modified with one or more of a plurality of adjuvants including aromatic solvents, petroleum distillates, water liquid carriers, surface active dispersing agents and finely divided inert solids. Depending upon the concentration in the composition of the active product, such augmented compositions are adapted to be applied to parasites, their habitats or their food, or employed as concentrates and subsequently diluted with additional inert carrier to produce the ultimate treating compositions. In compositions to be employed as concentrates, the toxicant can be present in a concentration of from about 5 to 98 percent by weight.

The exact concentration of the halopyridyl phosphate product employed in a composition for application to the pest, its habitat or food, can vary provided a parasiticidal dosage of toxicant is supplied either on the organism or its environment, or in its food. This dosage of toxicant is primarily dependent upon the susceptibility of a particular organism to the halopyridyl phosphate compound. Good results are obtained with liquid compositions containing the toxicant in the amount of from 0.5 to 2000 parts or more by weight per million. Compositions containing as high as 90 percent by weight of toxicant are sometimes conveniently employed. With dusts, good results are obtained with compositions containing from 0.1 to 5 percent or more by weight of toxicant.

In the protection and preservation of adhesives, detergents, cutting oils, paints, polymeric materials, textiles, paper, and other similar products, good results are obtained when the compounds are incorporated in such products in the amount of at least 0.01 percent by weight, and preferbaly in the amount of from 0.1 to 2.0 percent by weight. In the preservation of wood, excellent results are obtained when the compounds are incorporated by conventional treatment of the wood in the amount of at least 0.05 pound per cubic foot of wood.

In the preparation of dust compositions, the halopyridyl phosphate product can be compounded with any of the finely divided solids such as pyrophyllite, diatomaceous earth, gypsum and the like. In such operations, the finely divided carrier is ground or mixed with the toxicant or wet with a solution of the toxicant in a volatile organic solvent. Similarly, dust compositions containing the halopyridyl phosphate product can be similarly compounded from various of the solid surface active dispersing agents, such as fuller's earth, attapulgite and other clays. Depending upon the proportions of ingredients, these dust compositions can be employed as concentrates and subsequently diluted with additional solid surface active dispersing agent or wtih pyrophyllite, diatomaceous earth, gypsum and the like to obtain the desired amount of active ingredient in a composition adapted to be employed for the control of pests. Also, such concentrate dust compositions can be dispersed in water, with or without the aid of dispersing agents, to form spray mixtures.

Further, the halopyridyl phosphate compound or a dust concentrate composition containing such compound can be incorporated in intimate mixture with surface active dispersing agents such as ionic and non-ionic emulsifying agents to form spray concentrates. Such concentrates are readily dispersible in liquid carriers to form sprays containing the toxicant in any desired amount. The choice of dispersing agent and amount thereof employed are determined by the ability of the agent to facilitate the dispersion of the concentrate in the liquid carrier to produce the desired spray composition.

Similarly, the halopyridyl phosphate product can be compounded with a suitable water-immiscible organic liquid and surface active dispersing agent to produce emulsifiable liquid concentrates which can be further diluted with water and oil to form spray mixtures in the form of oil-in-water emulsions. In such compositions, the carrier comprises an aqueous emulsion, that is, a mixture of water-immiscible solvent, emulsifying agent and water. Preferred dispersing agents to be employed in these compositions are oil-soluble and include the nonionic emulsifiers such as the organic acids, polyoxyethylene derivatives of sorbitan esters, complex ether alcohols and the like. However, oil-soluble ionic emulsifying agents such as mahogany soaps can also be used. Suitable organic liquids to be employed in the compositions include petroleum oils and distillates, toluene, liquid halohydrocarbons and synthetic organic oils.

When operating in accordance with the present invention, the halopyridyl phosphate product or a composition containing the toxicant is applied to the pests to be controlled, to their habitat including soil or to their food in any convenient fashion, for example, by means of hand dusters or sprayers or by simple mixing with the food to be ingested by the organisms. Application to the foliage of plants is conveniently carried out with power dusters, boom sprayers and spray dusters. In such foliar applications, the employed compositions should not contain any appreciable amounts of any phytotoxic diluents. In large scale operations, dusts or low-volume sprays can be applied from an airplane.

The control of parasitic organisms by the administration of the new halopyridyl phosphates is illustrated by the following examples.

EXAMPLE 8

In separate operations, aqueous compositions of the present halopyridyl phosphate compounds are prepared as follows:

Four parts by weight of a halopyridyl phosphate compound, 0.08 part of sorbitan trioleate (Span 85) and 0.02 part of a sorbitan monolaurate polyoxyethylene derivative (Tween 80) are dispersed in 40 milliliters of acetone to produce a concentrate composition in the form of a water-dispersible liquid. This concentrate composition is dispersed in water to provide aqueous compositions containing varying amounts of the toxicant.

Also, the halopyridyl phosphate compounds are formulated in water with an alkyl aryl sulfonate (Nacconol NR) and a substituted benzoid alkyl sulfonic acid (Daxad No. 27) to produce aqueous compositions. In such operations, the materials are ballmilled together to produce compositions containing varying amounts of one of the toxicants, 300 parts by weight of Nacconol NR and 300 parts by weight of Daxad No. 27.

Aqueous compositions prepared according to the foregoing have very desirable wetting properties and are especially adapted to be applied to such undesirable pests as aphids, mites, insects, and plant pathogens or to their habitats and food for the control of the organisms.

EXAMPLE 9

An aqueous spray composition containing 25 parts per million of O,O-diethyl O-3,5-dichloro-2-pyridyl phosphorothioate is prepared according to the procedures for the Span 85 type formulation set forth in Example 8. Also, aqueous spray compositions containing 12 parts per million of O,O-diethyl O-3,5,6-trichloro-2-pyridyl phosphorothioate, diethyl 3,5,6-trichloro-2-pyridyl phosphate, O-ethyl O-3,5-dichloro-2-pyridyl methylphosphoramidothioate, O - isopropyl O - 3,5-dichloro-2-pyridyl methylphosphoramidothioate and O-propyl O-3,5- dichloro-2-pyridyl methylphosphoramidothioate are prepared according to the ballmilling procedures set forth in Example 8.

These compositions are separately applied to fruit hosts infested with a number of plum curculio (*Conotrachelus nenuphar*) adults. Six days later, observations show that in the case of each of the tests compositions, there is a complete control of the plum curculio adults due to treatment with the compound.

EXAMPLE 10

Aqueous spray compositions containing 100 parts per million of O-isobutyl O-3,5-dichloro-2-pyridyl methylphosphoramidothioate, diethyl 3,5 - dichloro-2-pyridyl phosphate, O-isobutyl O-3,5,6-trichloro-2-pyridyl methylphosphoramidothioate, O - sec-butyl O-3,5,-dichloro-2-pyridyl methylphosphoramidothioate and O-ethyl O-3,5-dichloro-2-pyridyl ethylphosphoramidothioate, are prepared according to the ballmilling procedures described in Example 8. These compositions are separately applied to a series of cranberry bean plants in amounts sufficient to wet the foilage. The leaf surfaces are then allowed to dry and the plants then infested with a known number of southern armyworm (*Prodenia eridania*) larvae. Three days after infestation, the plants are examined to ascertain the control of southern armyworms attributable to the test compounds. It is found that in all cases complete kills of southern armyworm larvae are observed.

The halopyridinols employed in accordance with the present invention can be produced by the known processes of halogenation and hydrolysis as set forth in Rec. Trav. Chem., at 69, 685 (1950), 74, 59 (1955), and 69 1281 (1950), and in J. Chem. Soc. 83, 400. Thus, the various halogenated pyridines can be hydrolyzed to obtain the corresponding halogenated 2- and 4-pyridinols. The halogenated 3-pyridinols are prepared by the hydrolysis of the 3-halopyridines followed by their halogenation to obtain the desired and corresponding halo-3-pyridinols.

The O-loweralkyl phosphoramidochloridates and phosphoramidochloridothioates employed as starting materials in accordance with the teachings of the present application are prepared by reacting two molecular proportions of a suitable amine with one molecular proportion of an O-loweralkyl phosphorodichloridate or phosphorodichloridothioate at a temperature of from −10 to 50° C. Upon completion of the reaction, the desired product is separated by conventional methods.

The phosphorodiamidochloridates, phosphorodiamidochloridothioates, diester phosphorochloridates and diester phosphorochloridothioates, employed as starting materials as described herein, are prepared in known procedures by reacting phosphorus oxychloride or phosphorus thiochloride with an alkali metal alcoholate or amino compound to introduce two alkoxy groups or amino groups in the molecule. Where it is desired to produce the mixed diester or mixed diamino compound, the phosphorus oxychloride or phosphorus thiochloride is successively reacted with different alcoholates or amino compounds. Good results are obtained when employing stoichiometric amounts of the reagents and operating at temperatures at which chloride of reaction is formed. Following the reaction, the desired products are separated by known procedures.

The O-loweralkyl phosphorodichloridates or phosphorodichloridothioates are prepared by reacting a molecular excess of phosphoryl oxychloride or phosphoryl thiochloride with a suitable loweralcohol. Good results are obtained when operating at temperatures of from 20° to 100° C., and employing from four to ten moles of phosphoryl compound with one mole of lower alcohol.

I claim:
1. A compound corresponding to the formula

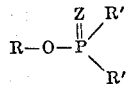

wherein R represents halopyridyl, Z represents a member of the group consisting of oxygen and sulphur, and each R' represents a member of the group consisting of loweralkoxy, amino, and loweralkylamino.

2. O - methyl O - 3,5,6 - trichloro-2-pyridyl isopropylphosphoramidothioate.
3. O,O - diethyl O - 3,5,6-trichloro - 2 - pyridyl phosphorothioate.
4. O - isopropyl O - 3,5 - dichloro - 2 - pyridyl methylphosphoramidothioate.
5. O - isobutyl O - 3,5 - dichloro - 2 - pyridyl methylphosphoramidothioate.
6. O - propyl O - 3,5 - dichloro - 2 - pyridyl methylphosphoramidothioate.
7. O - butyl O - 3,5 - dichloro - 2 - pyridyl methylphosphoramidothioate.
8. O - sec - butyl O - 3,5 - dichloro - 2 - pyridyl methylphosphoramidothioate.
9. O,O - diethyl O - 3,5 - dibromo - 6 - chloro - 2 - pyridyl phosphorothioate.
10. O,O - diethyl O - 5,6 - dichloro - 2 - pyridyl phosphorothioate.
11. A method which comprises applying to insects, their habitats and food a parasiticidal amount of a halopyridyl phosphate having the formula

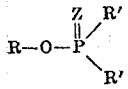

wherein R represents halopyridyl, Z represents a member of the group consisting of oxygen and sulfur, and each R' represents a member of the group consisting of loweralkoxy, amino, and loweralkylamino.

12. A composition comprising a parasiticide carrier selected from the group consisting of surface active dispersing agents and finely divided inert solids in admixture with a halopyridyl phosphate having the formula

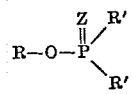

wherein R represents halopyridyl, Z represents a member of the group consisting of oxygen and sulfur, and each R' represents a member of the group consisting of loweralkoxy, amino, and loweralkylamino, said halopyridyl phosphate being present in a parasiticidal amount.

13. A composition claimed in claim 12 wherein the halopyridyl phosphate is present in an amount of from 0–05 to 98 percent by weight of total composition.

14. Diethyl (3,5,6-trichloro-2-pyridyl) phosphate.

15. The method claimed in claim 11 wherein the halopyridyl phosphate is O,O-diethyl O-(3,5,6-trichloro-2-pyridyl) phosphorothioate.

16. The method claimed in claim 11 wherein the halopyridyl phosphate is diethyl (3,5,6-trichloro-2-pyridyl) phosphate.

17. The composition claimed in claim 12 wherein the halopyridyl phosphate is O,O-diethyl O-(3,5,6-trichloro-2-pyridyl) phosphorothioate.

18. The composition claimed in claim 12 wherein the halopyridyl phosphate is diethyl (3,5,6 - trichloro - 2 - pyridyl) phosphate.

References Cited by the Examiner
UNITED STATES PATENTS

| | | | |
|---|---|---|---|
| 2,552,536 | 5/1951 | Drake et al. | 260—461 |
| 2,552,537 | 5/1951 | Drake et al. | 260—461 |
| 2,552,538 | 5/1951 | Drake et al. | 260—461 |
| 2,552,539 | 5/1951 | Drake et al. | 260—461 |
| 2,552,540 | 5/1951 | Drake et al. | 260—461 |
| 2,552,541 | 5/1951 | Drake et al. | 260—461 |
| 2,599,516 | 6/1952 | Moyle | 167—30 |
| 2,754,302 | 7/1956 | Gysin et al. | 260—297 |
| 2,761,806 | 9/1956 | Boyer | 167—30 |
| 2,844,582 | 7/1958 | Raley | 260—297 |
| 2,879,286 | 3/1959 | Tolkmith et al. | 167—30 |
| 2,881,201 | 4/1959 | Schrader | 167—30 |
| 2,897,227 | 7/1959 | Slagh | 167—30 |
| 2,938,831 | 5/1960 | Gordon | 167—33 |
| 2,961,445 | 11/1960 | Saul | 260—294.8 |

FOREIGN PATENTS

| | | |
|---|---|---|
| 198,061 | 8/1956 | Austria. |
| 1,105,254 | 11/1955 | France. |
| 713,278 | 8/1954 | Great Britain. |

(Other references on following page)

OTHER REFERENCES

Bernthsen et al.: "Organic Chemistry," 1931 ed., pp. 567-9 (Van-Nostrand).

Fieser et al.: "Organic Chemistry," 3rd edition, page 796, Reinhold (1956).

Frear et al.: "J. Economic Entomology," vol. 40, No. 5, pages 736-741 (1947).

King: "Chemicals Evaluated as Insecticides and Repellants at Orlando, Florida," U.S.D.A. Agriculture Handbook No. 69, May 1954, U.S. Govt. Printing Office.

WALTER A. MODANCE, *Primary Examiner.*

IRVING MARCUS, NICHOLAS S. RIZZO, ROBERT T. BOND, *Assistant Examiners.*